R. B. WASSON.
METHOD OF MAKING PISTON RINGS.
APPLICATION FILED MAR. 24, 1916. RENEWED JAN. 4, 1918.

Patented Apr. 30, 1918.

R. B. WASSON.
METHOD OF MAKING PISTON RINGS.
APPLICATION FILED MAR. 24, 1916. RENEWED JAN. 4, 1918.
1,264,462.
Patented Apr. 30, 1918.
2 SHEETS—SHEET 2.
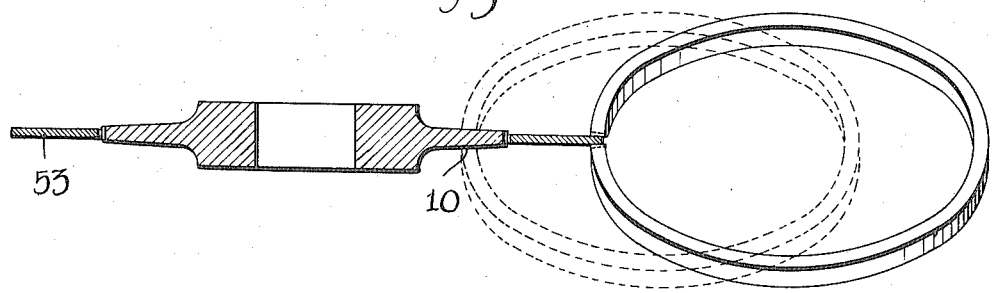
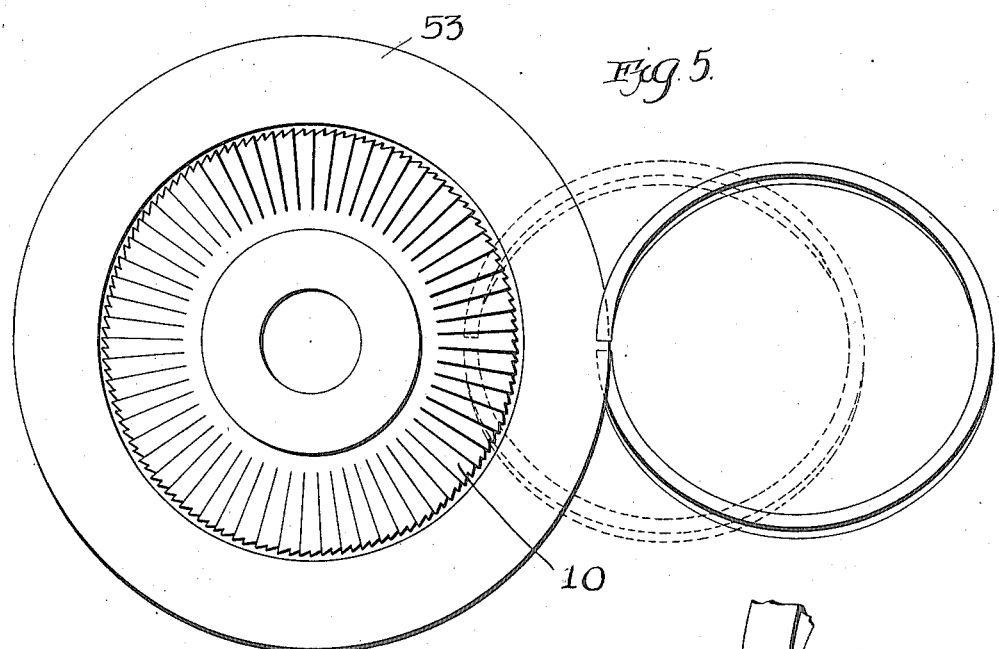
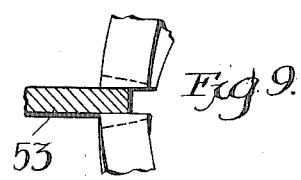
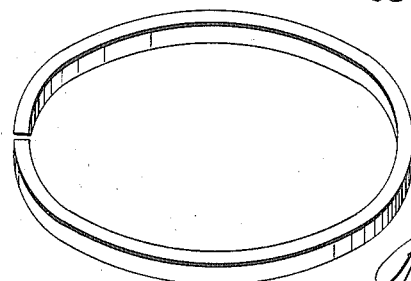
WITNESS
INVENTOR
Robert B. Wasson
BY
ATTORNEY

UNITED STATES PATENT OFFICE.

ROBERT B. WASSON, OF CRANFORD, NEW JERSEY.

METHOD OF MAKING PISTON-RINGS.

1,264,462.  Specification of Letters Patent.  Patented Apr. 30, 1918.

Application filed March 24, 1916, Serial No. 86,377. Renewed January 4, 1918. Serial No. 210,403.

*To all whom it may concern:*

Be it known that I, ROBERT B. WASSON, a citizen of the United States, residing in Cranford, Union county, State of New Jersey, have invented certain new and useful Improvements in Methods of Making Piston-Rings, of which the following is a specification.

This invention relates to an improvement in methods of making piston rings, having for its object, more particularly, to produce rings with an approximately uniform, minimum amount of end clearance. By end clearance is meant the space left between the ends of a ring when the same is in its cylinder or confined state, to allow for inaccuracies, including those which occur in the machining of the cylinder or in the manufacture of the ring, and for linear expansion of the ring when heated, so that the ends may not contact under working conditions, such contacting of the ring ends being likely to cause the ring to bind in the cylinder and producing objectionable wear of the cylinder and loss of power through friction. For these reasons the provision of end clearance is essential, but since the opening thus formed in the otherwise substantially gas-tight barrier, if too large, is a source of power loss through leakage, it is important for efficiency that the amount of clearance be as small as possible, still allowing for all the factors which make it necessary. In accordance with my invention, the clearance is reduced to a minimum and rendered approximately uniform (in any given size of ring), so as to insure against the ring ends contacting, on the one hand, and against excessive leakage losses, on the other.

In the accompanying drawings illustrating the invention:

Fig. 4 is a partly diagrammatic perspective view of the ring compressed to this degree of confinement, showing the relation between the same and a gage and cutter used for the end clearance forming operation, the ring being shown in two positions in full and dotted lines;

Fig. 5 is an elevation corresponding to Fig. 4 indicating by full and dotted lines the extent of the relative feeding movement between the ring and cutter;

Fig. 7 is a perspective view of the finished ring compressed to its working diameter, the end clearance being exaggerated, and Fig. 8 is a side elevation thereof; and Fig. 9 is a diagrammatic detail indicating in dotted lines the angle, exaggerated, between the faces, which is formed by the cutter.

Figure 1:
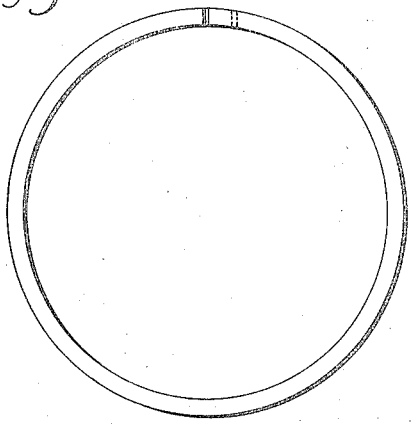
Figure 1 is a face view of a ring blank split with slight removal of metal.
Figure 2:
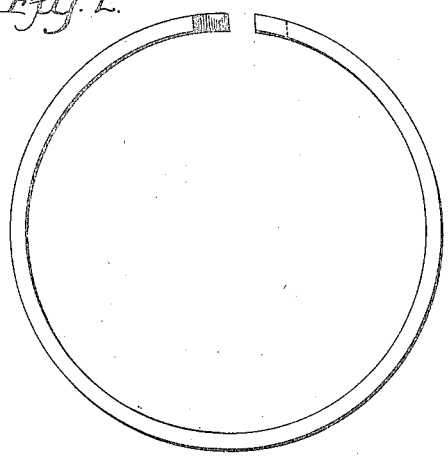
Fig. 2 is a face view of the same opened by hammering or other equivalent operation for imparting circumferentially uniform outward spring pressure.

The manufacture of the rings up to the end clearance steps may involve known methods of procedure, more especially those disclosed in my Patent No. 1,009,000 dated November 14, 1911. In accordance with that method blanks are produced, of uniform cross-section throughout and of the final internal diameter and approximately the final external diameter, and these blanks are then split at one point, with slight removal of metal, this stage being illustrated in Fig. 1. Then by variably hammering the inner circumference of the ring without materially altering the uniform cross-section of the ring, the split annulus is caused to open, as shown in Fig. 2, so that when compressed to enter a cylinder it will exert substantially uniform outward spring pressure at all points around the circumference, thereby fitting the cylinder exactly all the way around without undue pressure at certain points and separation at others, and with just the requisite force of contact to insure a sufficiently gas-tight joint and to avoid unnecessary wear and friction power losses.

Having provided myself with an open and substantially finished ring, I proceed to the steps for producing the end clearance. For this purpose I compress the ring and hold or clamp it in a definite manner, with its ends preferably in proximity, and operate thereon with a suitable cutter or metal-removing device, which enters between the ends and preferably acts upon both simultaneously, taking off the necessary amount of metal and leaving the end faces in such angular relation that, when the ring is placed upon a piston and introduced into a cylinder, its said end faces will be separated by approximately the exact amount of necessary end clearance and will be substantially parallel to each other. In this connection it may be observed that, while rings split and hammered as I have described may be assumed, when split, to have parallel end faces, the saw employed for the splitting having parallel sides, the said end faces are not found to be parallel after the ring has been opened out by hammering and compressed again as under working conditions. It is accordingly an object of this invention not only to provide approximately uniform end clearance but also to correct this non-parallel condition of the end faces, and this is accomplished by taking off from the ends such a wedged slice that upon compression the ring will have substantially parallel ends separated by the desired end clearance.

Figure 3:
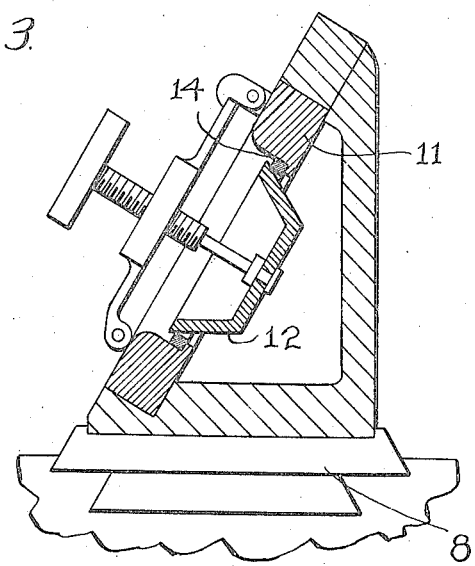
Fig. 3 is a sectional view illustrative of a manner of holding the ring in fixed relation at a predetermined degree of compression, so that its ends may be acted upon for removal of metal for end clearance.
Figure 6:
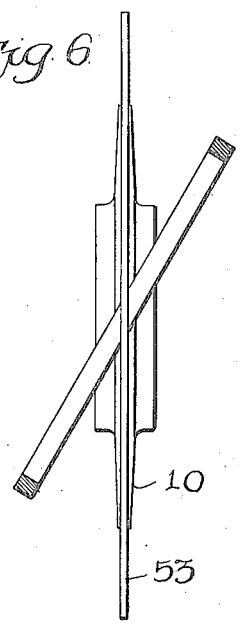
Fig. 6 is a side elevation of the parts shown in Fig. 5 looking toward the left in said figure.

The holding of the ring and the removal of the end clearance may be effected by means and in a machine such as disclosed in my co-pending application, filed March 24th, 1916, Serial No. 86,376, similar means being shown in simplified fashion in the accompanying drawings for purposes of illustration. Thus, for confining the ring within a predetermined diameter, such as indicated in Fig. 3, I make use of a chuck 11 having a circular seat 14 of predetermined diameter, this diameter being preferably somewhat larger than the cylinder bore for which the ring is designed (since otherwise the cutter would have to be too thin for practical purposes), but sufficiently smaller than the opened size of the ring (see Fig. 2) to bring the ends into proximity. As explained in my other application aforesaid, the internal diameter of the holder, that is to say, the degree of confinement of the ring and the consequent separation of the ends prior to the end clearance removal, must be determined with reference to the thickness of the cutter, the angle of the faces, or degree of taper, of this cutter, and the extent of relative feed between the ring and taper cutter during the cutting operation, and while these factors are not of fixed and precise value, since any one of them may be changed as a matter of convenience, provided proper compensating changes be made in others, the relation between them is such as to result in an approximately uniform, minimum end clearance with substantial parallelism between the faces, for any particular size and style of ring. Naturally, in different sizes of ring the amount of end clearance must be varied. In other words, the relation between them is such that upon compressing the ring to the diameter of the cylinder in which it is to be used, the faces will be parallel and at a distance apart equal to the approximate end clearance desired. This in fact gives a very simple, practical method of determining the proper angle of the cutter. A split ring after being hammered may have its end faces machined or filed by hand until, when placed in a circular die of the exact diameter of the cylinder in which the ring is to be used, these faces are exactly parallel and their distance apart equal to the desired end clearance. Then on placing the model ring in a circular die of somewhat larger diameter, the end faces will separate making an angle with each other. This is the angle to be given to the cutter, i. e. it is the angle between the faces of the cutter. The distance between the ends of the model ring determines the thickness of the cutter so that by selecting a die of sufficient diameter the ring opens and the gap in the ring becomes large enough to give the cutter the proper strength and bodily thickness. The depth of the feed of the cutter will be that which brings the faces of the cutter having the above angle in contact with the end faces of the model ring. The angle of the cutter and the depth of feed having thus been determined, the cutter may be used to provide the approximately desired end clearance in rings of the same diameter.

Coöperating with the chuck is a conical clamp 12, which holds the ring to its seat all the way around, both this clamp and the chuck having suitable entrances at one side for the cutter 10 and the gage 53. The cutter illustrated is a disk, suitably mounted and rotatably driven, having cutting edges or teeth on both sides and preferably also on the periphery and the said sides converging toward each other from the central portion to the periphery. The gage 53, which is preferably in fixed relation to the axis of the cutter, has its operative portion directly in front of the cutter edge and preferably narrower than the same, its function being to insure the proper positioning of the split in the ring with reference to the cutter, and, also, if need be, or if desired, to limit the degree of approach of these ends prior to the end clearance removal and to that extent to determine the amount of such removal. The removal is effected by revolving the cutter and producing relative feed between the same and the ring. Either the ring or the cutter may be advanced, the drawing indicating the former, the ring chuck being mounted on a suitable, guided carriage 8, the forward or inward movement of which is limited by means of an adjustable stop. The angle which the end faces make with each other when the ring is in the machine and which is produced by the act of removing the end clearance (see dotted lines at the ring ends in Figs. 4 and 9) is such that when the ring is subsequently confined to its working diameter in the cylinder, and the ends are brought together as closely as may be without danger of contacting, the said faces will then be equally close together at the outer circumference and at the inner. As will be appreciated, the result of a clearance slot the walls of which have an angular instead of a parallel relation under working conditions may be, on the one hand, to cause contacting of the ends at the narrowest point, or to cause the clearance to be wider than necessary everywhere but at this point, and in any event to permit of an avoidable amount of leakage. The exact angle between the sides of the taper cutter for producing the angle of the end faces by which this condition of obliquity is avoided varies according to the kind and size of rings being manufactured, and like the other factors involved in the production of the end clearance may be ascertained for any particular case by calculation, or in the manner indicated above.

The drawings illustrate the formation of end clearance in a ring which has a diagonal split, but it will be understood that I do not so limit my invention. It may be noted that the relative feed between the ring and the cutter is in the direction of the line between their centers, this relation being desirable in order to secure the substantial uniformity of separation of all portions of the end faces under working conditions.

What I claim as new is:

1. Method for the manufacture of piston rings, comprising splitting the rings, operating upon the inner surfaces thereof so as to cause the same to open, compressing the split and tensioned rings to a predetermined diameter, and operating between the ends thereof while confined for the production of end clearance.

2. Method for the manufacture of piston rings, comprising splitting the rings, operating upon the inner surfaces thereof so as to cause the same to open, compressing and holding the split and tensioned rings with their ends in proximity, and operating upon said ends for the production of end clearance.

3. In the manufacture of a piston ring, the steps which comprise splitting a ring, operating upon its inner surface so as to cause the same to open, bringing the ends of the ring into proximity again, and operating upon said ends simultaneously for the production of end clearance.

4. In the manufacture of a piston ring, the steps which comprise splitting a ring, operating upon its inner surface so as to cause the same to open, holding the ring at a predetermined degree of confinement, and operating between said ends for the production of end clearance.

5. The method of making piston rings having a substantially uniform, minimum end clearance, which comprises producing rings open at one side, fixedly clamping each ring at a predetermined degree of confinement, and while the rings are so clamped operating upon their ends for the production of end clearance.

6. The method of making piston rings having a substantially uniform, minimum end clearance, which comprises producing rings open at one side, fixedly clamping each ring with its ends in fixed relation to a cutter, and operating the cutter to remove metal from said ends.

7. The method of making piston rings having a substantially uniform, minimum end clearance, which comprises producing rings open at one side, fixedly clamping each ring with its ends in proximity, cutting upon and between the ends to remove metal at a predetermined angle, and producing an accurate feed movement of predetermined extent inwardly of the ring between the ring and cutter.

8. In the manufacture of piston rings, the steps which comprise fixedly clamping a divided ring with its ends in proximity, cutting upon and between said ends to remove metal at a predetermined angle, and producing an accurate feed movement of predetermined extent between the ring and cutter.

9. In the manufacture of piston rings, the steps which comprise fixedly clamping a divided ring with its ends in proximity, cutting upon and between said ends to remove metal at a predetermined angle, and producing a feed movement of predetermined extent inwardly of the ring between the ring and cutter, the direction of said feed movement being parallel with the line of centers of the ring and cutter.

10. A method of manufacturing piston rings, which comprises splitting a ring blank, operating upon the inner face thereof so as to cause the same to open, holding the ring at a predetermined degree of confinement, and removing metal for end clearance from the ends thereof, and forming the end faces at such angle as to produce substantial parallelism under working conditions.

11. In the manufacture of piston rings, the steps which comprise producing a divided ring, and removing metal from the ends thereof in such manner that under working conditions the end faces are substantially parallel and separated by substantially a predetermined minimum end clearance.

12. In the manufacture of piston rings, the steps which comprise dividing a ring, and thereafter removing metal from the ends in an amount and at an angle to cause the end faces to lie substantially parallel and spaced by substantially a predetermined minimum end clearance under working conditions.

13. A method of making piston rings, which comprises splitting an annulus, operating upon the inner surface thereof so as to cause the same to open, and operating upon the ends of the ring so as to remove metal for end clearance and to leave the end faces in such angular relation that they are substantially parallel when the ring is compressed to its working diameter.

14. A method of making piston rings, which comprises splitting an annulus, operating upon the inner surface thereof so as to cause the ring to open, partly compressing the ring and holding it in such condition, and then operating upon the ends simultaneously to remove metal therefrom for end clearance and to form the end faces at such angles that they will be substantially parallel under working conditions.

In testimony whereof, I have signed my name to this specification, in the presence of two subscribing witnesses.

ROBERT B. WASSON.

Witnesses:
R. R. ZIMMER,
MATTIE A. BUTTERWORTH.